US006999618B2

(12) United States Patent
Ohta

(10) Patent No.: US 6,999,618 B2
(45) Date of Patent: Feb. 14, 2006

(54) OBJECT EXTRACTION DEVICE, OBJECT EXTRACTION METHOD, AND RECORDING MEDIA FOR STORING AN OBJECT EXTRACTION PROGRAM

(75) Inventor: Hiroshi Ohta, Tokyo (JP)

(73) Assignee: NEC Corporation, Tokyo (JP)

( * ) Notice: Subject to any disclaimer, the term of this patent is extended or adjusted under 35 U.S.C. 154(b) by 732 days.

(21) Appl. No.: 09/781,280

(22) Filed: Feb. 13, 2001

(65) Prior Publication Data
US 2001/0016070 A1    Aug. 23, 2001

(30) Foreign Application Priority Data
Feb. 18, 2000  (JP)  ............ P2000-041227

(51) Int. Cl.
*G06K 9/00*    (2006.01)
(52) U.S. Cl. .......... 382/171; 382/172; 382/177; 382/266; 382/270
(58) Field of Classification Search ........ 382/154, 382/171, 172, 176, 177, 178, 179, 266, 267–270; 345/623, 624, FOR 214; 378/41; 396/FOR 861; 348/47, 48
See application file for complete search history.

(56) References Cited

U.S. PATENT DOCUMENTS

| | | | | |
|---|---|---|---|---|
| 5,202,928 A | * | 4/1993 | Tomita et al. ............ 382/154 |
| 5,604,822 A | * | 2/1997 | Pearson et al. ........... 382/199 |
| 5,819,016 A | * | 10/1998 | Watanabe et al. .......... 345/419 |
| 5,825,915 A | * | 10/1998 | Michimoto et al. ........ 382/154 |
| 5,845,006 A | * | 12/1998 | Sumi et al. .............. 382/154 |
| 5,995,649 A | * | 11/1999 | Marugame ................ 382/154 |
| 6,034,759 A | * | 3/2000 | Enomoto ................. 355/41 |
| 6,205,242 B1 | * | 3/2001 | Onoguchi ............... 382/154 |
| 6,262,694 B1 | * | 7/2001 | Ishimoto et al. .......... 345/1.1 |
| 6,480,620 B1 | * | 11/2002 | Sakamoto ............... 382/154 |
| 6,483,949 B1 | * | 11/2002 | Yokoyama et al. ........ 382/278 |
| 6,493,465 B2 | * | 12/2002 | Mori et al. ............. 382/209 |
| 6,674,905 B1 | * | 1/2004 | Matsugu et al. .......... 382/199 |

FOREIGN PATENT DOCUMENTS

JP        10-23311       1/1998
JP       2000-28333      1/2000

OTHER PUBLICATIONS

Harpreel S. Sawhney, "simplifying motion and structure analysis using planar parallax and image warping", IEEE 1994. pp. 403-408 vol. 1.*

(Continued)

*Primary Examiner*—Samir Ahmed
*Assistant Examiner*—Brian Le
(74) *Attorney, Agent, or Firm*—McGinn IP Law Group, PLLC

(57) ABSTRACT

An object extraction device. In an exemplary embodiment, a first object extraction calculating device finds an object extraction image by employing object extraction calculations for extraction of an object by using a predetermined first calculation parameter on photographed images having a parallax with respect to the object. An incorrect outline extraction processor extracts an outline from the object extraction image and extracts an incorrect outline segment from the extracted outline. A recalculated region determining device determines as a recalculated region a partial region that includes the incorrect outline segment. A second object extraction calculating device finds a re-extracted image that includes an object extraction image of the recalculated region, by carrying out an object extraction calculation in order to eliminate the incorrect outline segment in the recalculated region by using a second calculation parameter that is different from the first calculation parameter on the photographed images.

23 Claims, 8 Drawing Sheets

OTHER PUBLICATIONS

Japanese Office Action dated Aug. 26, 2003, with partial English translation.

Kodo, J.; Ota M.; Discourse relating to object extraction using multi-eye picture images; Collection of discourses of the Electronic Information Communication Association; Electronic Information Communication Association; Mar., 1996; vol. 1996, No. Sogo Pt7, pp. 334.

* cited by examiner

OBJECT EXTRACTION DEVICE, OBJECT EXTRACTION METHOD, AND RECORDING MEDIA FOR STORING AN OBJECT EXTRACTION PROGRAM

BACKGROUND OF THE INVENTION

1. Field of the Invention

The present invention relates to image processing, and more particularly to an advantageous object extraction device, object extraction method, and recording media storing an object extraction program used in the extraction of an object image.

2. Description of the Related Art

The object extraction methods described below are known conventional methods for obtaining an object extraction image by extraction only an object from a plurality of photographed images in which the same object is photographed along with a background.

First, when the photograph image (referred to hereinafter as the "central image") of the object that will serve as the object extraction image and the photograph images (referred to hereinafter as the "reference images") of the object having parallax with respect to the central image are output, the central image is partitioned into bands in the horizontal direction, and the image partitioned into bands is further partitioned into segments that are enclosed by the edge points of the object. Next, the location of the corresponding points that correspond to the end point of each of the segments are searched for on an epipolar line, and as a result the depth is estimated based on the obtained parallax. Next, based on this estimated depth information, each of the segments of the central image is partitioned into foreground segments and background segments. Next, the set of partitioned segments in the foreground is obtained as the object extraction image. However, in the case that one part of this image is lost when this object retraction image is formed, if there is an effective segment in a range sufficiently close when viewed vertically, the lost segment is interpolated by pixels in the horizontal and vertical directions.

Moreover, in this object extraction method, the calculation parameters such as the number of pixel spans during each of the calculations and the brightness difference used for edge identification is set in advance.

Furthermore, in the case that a background part is extracted as the object, the set of segments grouped in the background segments may serve as the object extraction image.

FIG. 15 is a block diagram showing an example of the structure of a conventional object extraction device. In this figure, reference numeral 1 is the central camera that photographs the central image P1, reference numerals 2-1 and 2-2 are reference cameras that photograph reference images P2-1 and 2-2, and reference numeral 3 is an object extraction calculating unit that finds the object extraction image P3 by carrying out an extraction calculation of the object image on the input central image P1, and reference images P 2-1 and 2-2 according to the above-described object extraction method by using a calculation parameter set in advance. In addition, this object extraction calculating unit 3 is a conventional object extraction device.

Moreover, the conventional object extraction device is realized by large-scale computers, etc., such as a work station into which an object extraction program that uses the above-described convention extraction method, for example, is input.

However, in the above-described object extraction device, in the case that a part of the object extraction image is lost, in the interpolation processing using pixels in the horizontal and vertical directions, there is the problem that the locations that should be background image are mistaken for a foreground segment and made a part of the object extraction image, or an object extraction image expanded beyond the actual object is formed, a location that should be a foreground object extraction image is mistakenly made a part of the background image, and an object extraction image having a blank part is formed.

In addition, when the object extraction calculation is carried out by changing to a more sophisticated calculation parameter in order to resolve the above-described problems, the amount of the calculating increases, and more time is consumed to find the object extraction image. As a result a large-sale computer is necessary for realizing the conventional object extraction device.

SUMMARY OF THE INVENTION

In consideration of the above-described problems, an object of the present invention is to provide an image extraction device, an object extraction method, and a recording media that stores an object extraction program wherein an object extraction image that better matches the object can be obtained and the amount of computing for finding the object extraction image can be decreased.

In order to resolve the above-described problems, a first aspect of the present invention provides a first object extraction calculating device that finds the object extraction image by carrying out object extraction calculations for extraction an object by using a predetermined first calculation parameter on a plurality of photographed images having a parallax with respect to the same object, and an incorrect outline extraction processing device that extracts an outline from an object extraction image found by the first object extraction calculating device and extracts as an incorrect outline a straight line segment having a length exceeding a predetermined threshold value within the extracted outline.

In a second aspect of the invention disclosed in the first aspect, the incorrect outline extraction processing device provides an outline extraction device that extracts an outline from an object extraction image found by the object extraction calculating device, an edge pixel calculating device that finds the edge part of the object from a predetermined photographed image from among the plurality of photographed images, and an incorrect outline extraction device that extracts as an incorrect outline the straight line segment within the outline extracted by the outline extraction device that is the outline part that does not include the edge part found by the edge pixel calculating device and has a length exceeding a predetermined value.

In a third aspect of the invention disclosed in the first aspect, the incorrect outline processing device provides an outline extraction device that extracts an outline from an object extraction image found by the object extraction calculating device, an edge pixel calculating device that finds the edge part of the object from a specified photographed image from among a plurality of photographed images, and an incorrect outline extraction device that extracts as an incorrect outline the straight line segment that is the outline part within the outline extracted by the outline extraction device that does not include the edge part found by the edge pixel calculating device and has a length exceeding a predetermined value.

In a fourth aspect of the invention disclosed in the first aspect, the incorrect outline processing device provides an outline extraction device that extracts an outline from an object extraction image found by the object extraction calculating device, an edge pixel calculating device that finds the edge part of the object from a specified photographed image from among a plurality of photographed images, and an incorrect outline extraction device that extracts as an incorrect outline the straight line segment that is the outline part within the outline extracted by the outline extraction device that does not include the edge part found by the edge pixel calculating device and has a length exceeding a predetermined first threshold value and the straight line segment that is the outline part that intersects the edge part found by the edge pixel calculating device and has a length exceeding a predetermined second threshold value.

In a fifth aspect of the invention disclosed in the first aspect, the straight line segment is a straight line segment along the scanning direction of a predetermined photographed image.

A sixth aspect of the invention discloses in the first aspect provides a recalculated region determining device that determines as the recalculated region the partial region that includes the incorrect outline extracted by the incorrect outline extraction processing device within the image region of a predetermined photographed image, and a second object extraction calculating device that finds the re-extracted image that is the object extraction image of the recalculated region by carrying out object extraction calculation in order to eliminate the incorrect outline of the recalculated region by using a second calculation parameter that is different from the first calculation parameter on a plurality of photographed images.

In a seventh aspect of the invention, the recalculated region in the sixth aspect of the invention is determined as the rectangular region having a predetermined range that includes the incorrect outline.

In an eighth aspect of the invention, the recalculated region determining-device in the sixth aspect of the invention re-determines as the recalculated region the region that encompasses all of the overlapping recalculated regions instead of a plurality of overlapping recalculated regions.

In a ninth aspect of the invention, the recalculated region in the eighth aspect of the invention that has been re-determined is determined as the rectangular region having the smallest area.

A tenth aspect of the invention disclosed in the sixth aspect provides an image reconstructing device that reconstructs the object extraction image based on the object extraction image found by the first object extraction calculating device and the re-extracted image found by the second object extraction calculating device.

In an eleventh aspect of the invention, the image reconstructing device in the tenth aspect reconstructs the object extraction image by exchanging the image in the region corresponding to the recalculated region within the image region of the object extraction image found by the first object extraction calculating device and the re-extracted image found by the second object extraction calculating device.

In a twelfth aspect of the invention, the second calculation parameter in the eleventh aspect is a calculation parameter that is used to carry out an object extraction calculation that is more sophisticated than the first calculation parameter.

In a thirteenth aspect of the invention, the object extraction device in the eleventh aspect is realized by a small-scale computer.

In the fourteenth aspect of the invention, the plurality of photographed images in the first aspect are photographed by a plurality of cameras that photograph the same object from different directions.

A fifteenth aspect of the invention provides an object extraction calculating device that repeats the object extraction calculation for eliminating an incorrect outline from a predetermined partial region on the plurality of photographed images having parallax with respect to the same object using a predetermined calculation parameter that is different from the initial calculation parameter, and finds the re-extracted image, which is the object extraction image of this partial region.

In a sixteenth aspect of the invention, the partial region in the fifteenth aspect of the invention is a region that includes the outline part determined to be an incorrect outline in the image region of the object extraction image found by carrying out the object extraction calculation for extraction the object using the initial calculation parameter.

A seventeenth aspect of the invention in the fifteenth aspect provides an image reconstructing device that reconstructs the object extraction image by exchanging the image of the partial region in the object extraction image found by the object extraction calculation using the initial calculation parameter and the re-extracted image.

An eighteenth aspect of the invention provides a first process that finds an object extraction image by carrying out an object extraction calculation for extraction the object using a predetermined first calculation parameter on the plurality of photographed images that have parallax with respect to the same object, a second process that extracts the outline from the object extraction image found by the first process, a third process that extracts as an incorrect outline the straight line segment within the outline extracted by the second process that has a length exceeding a predetermined threshold value, a fourth process that determines as the recalculated region the partial region that includes the incorrect outline extracted by the third process within the image region of the predetermined photographed image, a fifth process that finds the re-extracted image, which is the object extraction image in the recalculated region, by carrying out object extraction calculation for eliminating the incorrect outline in the recalculated region using a predetermined second calculation parameter that is different from the first calculation parameter on the plurality of photographed images, and a sixth process that reconstructs the object extraction image based on the object extraction image found by the first process and the re-extracted image found by the fifth process.

In a nineteenth aspect of the invention, the third process in the eighteenth aspect finds the edge part of the object from the predetermined photographed image from among a plurality of photographed images and extracts as an incorrect outline either or both a straight line segment within the outline extracted by the second process that is the outline part not included in the found edge part and has a length exceeding a predetermined first threshold value or a straight line segment that is the outline part that intersects the found edge part and has a length exceeding a predetermined second threshold value.

In a twentieth aspect of the invention, a computer executes a first process that finds an object extraction image by carrying out object extraction calculation for extraction the object using a predetermined first calculation parameter on a plurality of photographed images having parallax with respect to the same object, a second process that extracts an outline from the object extraction image found by the first process, and a third process that extracts as an incorrect outline the straight line segment within the outline extracted by the second process that has a length exceeding a predetermined threshold value.

In a twenty-first aspect of the invention, the object extraction program in the twentieth aspect of the invention executes on a computer a fourth process that determines as the recalculated region the partial region that includes the incorrect outline extracted by the third process within an image region of the predetermined photographed image, a fifth process that finds the re-extracted image, which is the object extraction image in the recalculated region, by carrying out object extraction calculation for eliminating the incorrect outline in the recalculated region using a predetermined second calculation parameter that is different from the first calculation parameter on the plurality of photographed images, and a sixth process that reconstructs the object extraction image based on the object extraction image found by the first process and the re-extracted image found by the fifth process.

In a twenty-second aspect of the invention, the object extraction program in the twentieth aspect of the invention further executes on a computer a process that, in the third process, finds the edge part of the object from a predetermined photographed image from among a plurality of photographed images, and a process that extracts as incorrect outlines either or both of a straight line segment that is the outline part within the outline extracted by the second process not included in the found edge part and that has a length exceeding a predetermined first threshold value and a straight line segment that is the outline part that intersects the found edge part and has a length exceeding a predetermined second threshold value.

A twenty-third aspect of the invention executes on a computer a process that finds the re-extracted image, which is the object extracted image of the partial region, by repeating the object extraction calculation for eliminating incorrect outlines within a predetermined partial region on the plurality of photographed images having parallax with respect to the same object using a predetermined calculation parameter that is different from the initial calculation parameter.

In a twenty-fourth aspect of the invention, the object extraction program in the twenty-third aspect of the invention further executes on a computer a process that determines in a partial region the region that includes the determined outline part as an incorrect outline in an image region of the object extraction image found by carrying out the object extraction calculation for extraction the object using a initial calculation parameter.

In a twenty-fifth aspect of the invention, the object extraction program in the twenty-third aspect of the invention further executes on a computer a process that reconstructs the object extraction image by exchanging the image of the partial region in the object extraction image found by the object extraction calculation using the initial calculation parameter and the re-extracted image.

DETAILED DESCRIPTION OF THE INVENTION

The embodiments of the present invention will be explained referring to the figures.

Figure 1:
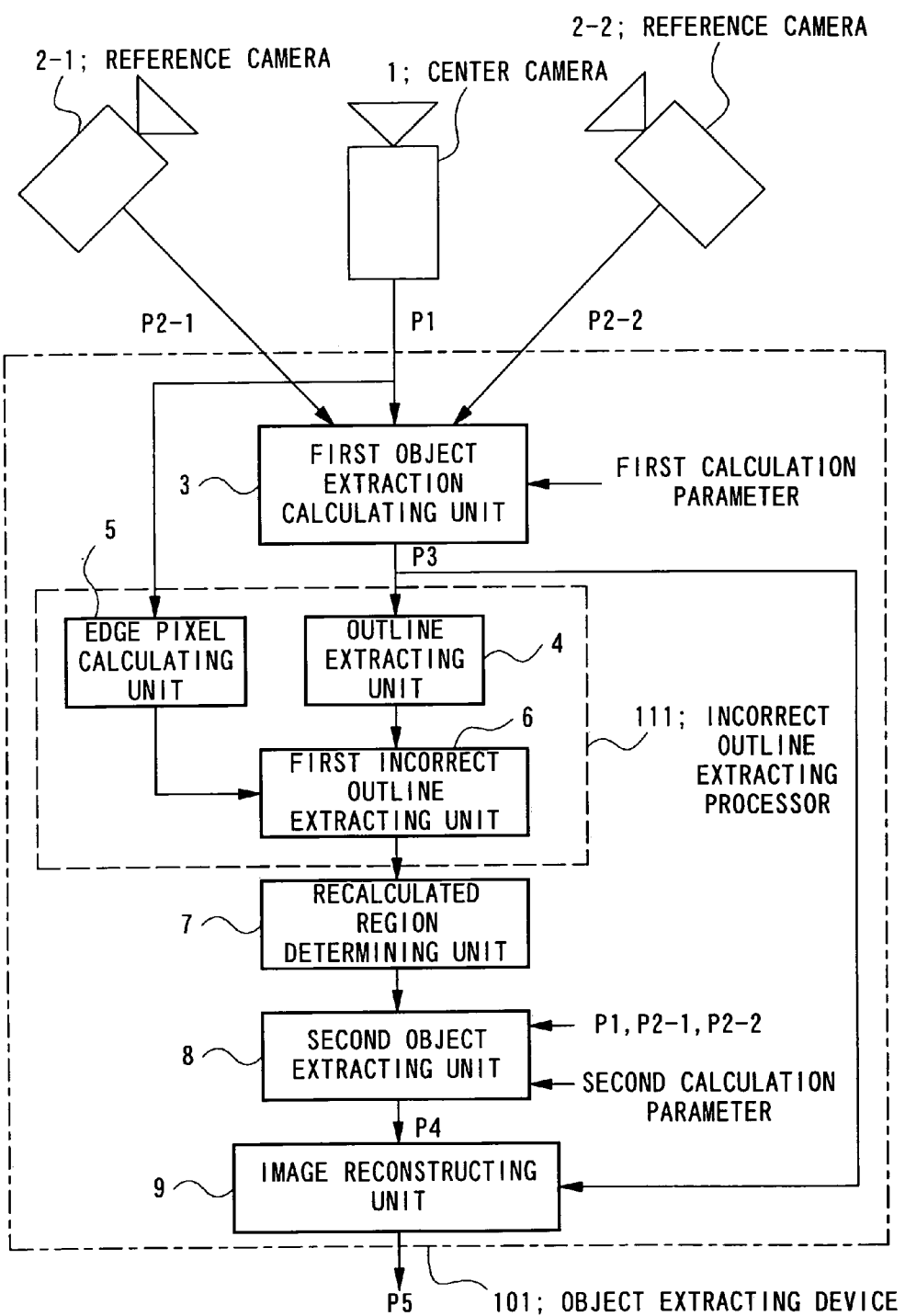
FIG. 1 is a block drawing showing the structure of the object extraction apparatus 101 according to the first embodiment of the present invention.
Figure 15:
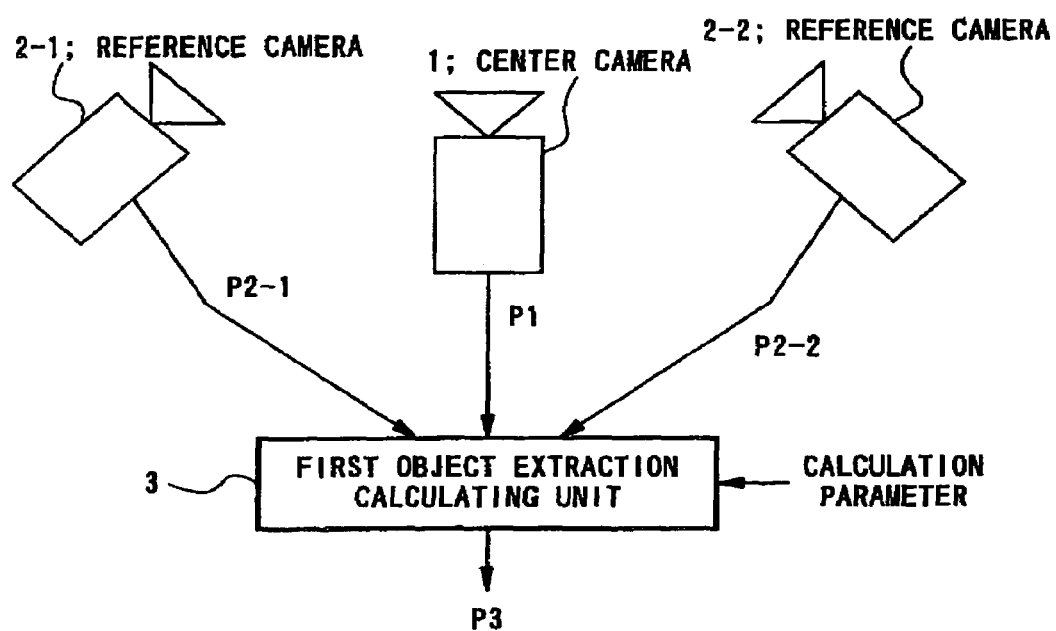
FIG. 15 is a block drawing showing the structure of a conventional object extraction device.

FIG. 1 is a block diagram showing the structure of the object extraction device 101 according to a first embodiment of the invention. In the figures, reference numeral 1 is a center camera that photographs a photographed image P1 (hereinafter, referred to as a "center image") of an object that will serve as the object extraction image, reference numerals 2-1 and 2-2 are reference cameras that photographs from different directions the same object that is photographed by the center camera, and photographs photographed images P2-1 and P2 (hereinafter, referred to as the reference images) of the object that have parallax with respect to the center image P1, and reference numeral 3 is a first object extraction calculating unit that carries out an extraction calculation of the object image using a predetermined calculation parameter on the center image P1 and the reference images P2-1 and 2-2 that have been input, and finds the object extraction image P3. Moreover, the center camera 1, the reference cameras 2-1 and 2-2, and the first object extraction calculating unit 3 are structures similar to the conventional object extraction device shown in FIG. 15, the object extraction calculation of the first object extraction calculating unit 3 is like the conventional object extraction calculating unit 3 in FIG. 15, and the object extraction calculation of the first object extraction calculating unit 3 is carried out using the first calculation parameter.

Reference numeral 111 is an incorrect outline extraction processing unit that extracts from the object extraction image P3 found by the first object extraction calculating unit 3 a suspected incorrect outline as the outline of the object 3, and comprises an outline extraction unit 4 that extracts an outline by tracing the outline part of an object from the object extraction image P3, an edge pixel calculating unit 5 that extracts the pixels on the edge part of the object from the input center image P1, and a first incorrect outline extraction unit 6 that extracts as an incorrect outline the straight line segment in the outline extracted by the outline extraction unit 4 that is the straight line segment not included in the pixels of the edge part found by the edge pixel calculating unit 5, and has a length exceeding a predetermined threshold value.

Reference numeral 7 is a recalculated region determining unit that determines as a recalculated region the rectangular region in a predetermined range that includes the incorrect outline extracted by the first incorrect outline extraction unit 6, reference numeral 8 is a second object extraction calculating unit that finds the re-extracted image P4, which is the object extraction image of the recalculated region, by carrying out an object extraction calculation for the recalculated region determined by the recalculated region determining unit 7 using a predetermined second calculation parameter that is different from the first calculation parameter on the input center image P1 and the reference images P2-1 and 2-2, and reference numeral 9 is an image reconstructing unit that reconstructs the object extraction image P5 by exchanging the image of the region that corresponds to the recalculated region within the image region of the object extraction image P3 found by the first object extraction calculating unit 3 and the re-extracted image 4 found by the second object extraction calculating device 8. Moreover, in the object extraction calculation of the second object extraction calculating unit 8, the object extraction calculation is carried out by using a second calculation parameter, like the first object extraction calculating unit 3.

Next, FIG. 4 to FIG. 8 are an example of drawings for explaining the operation of the object extraction device 101 shown in FIG. 1. The operation of the object extraction device 101 will be explained referring to these drawings.

Figure 4:
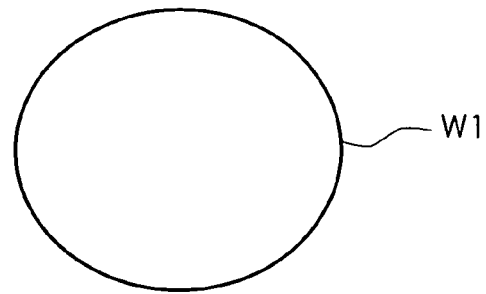
FIG. 4 is a first drawing for explaining the operation of the object extraction device 101 shown in FIG. 1.

First, FIG. 4 shows the outline W1 of an object photographed by the center camera 1, and the outline W1 of this complete circle and the interior of this outline W1 are the object. First, when the center image P1 and the reference images P2-1 and 2-2, which are the object photographed by the center camera 1 and the reference cameras 2-1 and 2-2, are input into the object extraction device 101, the first object extraction calculating unit 3 carries out object extraction calculation using a first calculation parameter, and the object extraction image P3 shown in FIG. 5 is found, where in FIG. 5, the solid lines between points A1–A2, A2–A3, A3–A4, and A4–A1 and the interior enclosed by these lines is the object extraction image P3.

Figure 5:
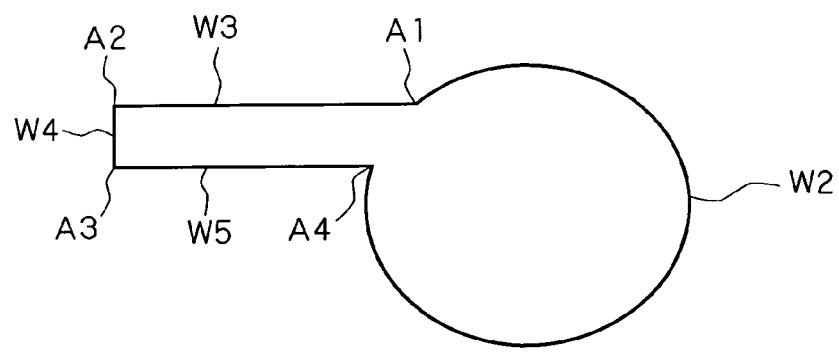
FIG. 5 is a second drawing for explaining the operation of the object extraction device 101 shown in FIG. 1.

Next, from the object extraction image P3 in FIG. 5, the outline extraction part 4 extracts as the outlines of the object the outline W2 between points A1–A4, which is part of the complete circle; outline W3, which is the straight line segment between points A1–A2; outline W4, which is the straight line segment between points A2–A3; and outline W5, which is the straight line segment between points A3–A4. However, outline W2 is a part of the outline W1, and outlines W3–W5 are not included in outline W1. In addition, the edge pixel calculating unit 5 extracts from the input center image P1 the pixels of the outline W1 shown in FIG. 4 as the edge part of the object.

Next, among the outlines W2–W5 extracted by the outline extraction unit 4 and among outlines W3–W5 that do not include the pixels of outline W1 in the edge part found by the edge pixel calculating unit 5, the first incorrect outline extraction unit 6 extracts as incorrect outlines the outlines W3 and W5, which are straight line segments that have a length exceeding a predetermined threshold value, where this predetermined threshold value is, for example, 8 pixels. Moreover, in the case that an incorrect outline is not extracted, the processing ends, and the object extraction image P3 is made the object extraction image P5 by the image reconstructing unit 9.

Figure 6:
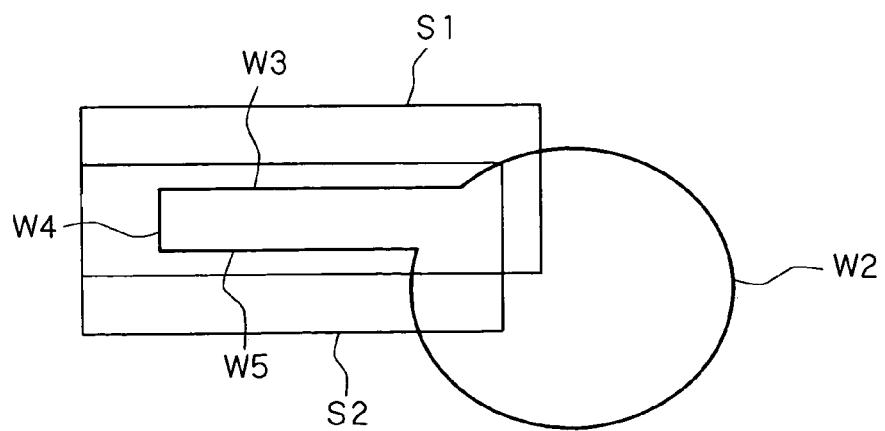
FIG. 6 is a third drawing for explaining the operation of the object extraction device 101 shown in FIG. 1.

Next, the re-calculated region determining unit 7 determines as one recalculated region the rectangular region S1 having the predetermined range shown in FIG. 6, which includes the outline W3 that was extracted as an incorrect outline by the incorrect outline extraction unit 6, and determines as one recalculated region the rectangular region S2 having the predetermined range shown in FIG. 6, which includes the outline W5. Here, for the straight line segment in a horizontal direction, the predetermined range of this determined rectangular region is, for example, the range separated only by the distance of 20 pixels each above, below, left, and right that enclose the line. In contrast, for a straight line segment in the vertical direction, the range is separated only by the distance of 20 pixels each above and below and 40 pixels each left and right that enclose this line. Next, the recalculated region determining unit 7 determines as the recalculated region the rectangular region S3 that is the rectangular region that encompasses all of the overlapping recalculated region shown in FIG. 7, and that has the minimum area.

Figure 8:
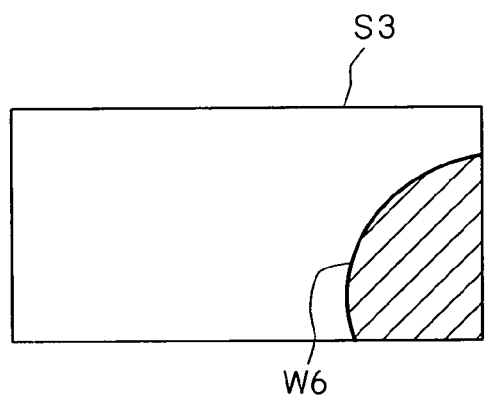
FIG. 8 is a fifth drawing for explaining the operation of the object extraction device 101 shown in FIG. 1.

Next, the second object extraction calculating unit 8 carries out the object extraction calculation for the rectangular region S3, which is the recalculated region determined by the recalculated region determining unit 7 using a predetermined second calculation parameter, on the input center image P and the reference images P2-1 and 2-2, and finds as the re-extracted image P4 the outline W6 shown in FIG. 8 and the inclined part encompasses by this outline.

Figure 7:
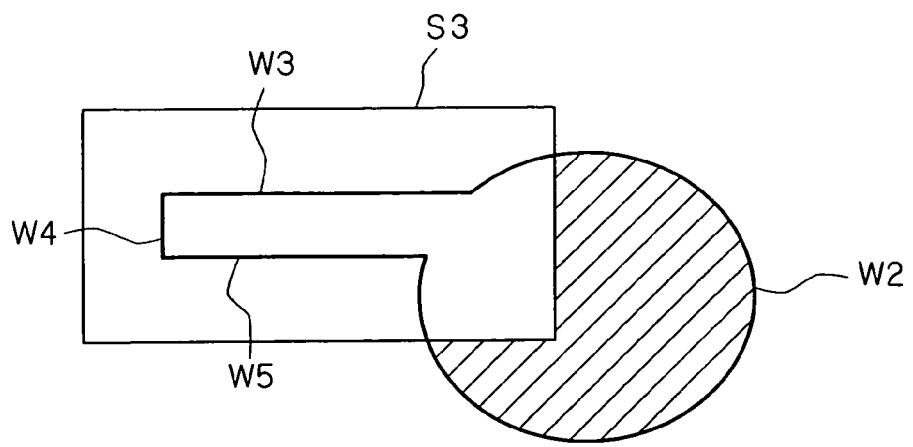
FIG. 7 is a fourth drawing for explaining the operation of the object extraction device 101 shown in FIG. 1.

Next, the image reconstructing unit 9 exchanges the image in the region corresponding to the recalculated region in the image region of the object extraction image P3 in FIG. 5, that is, the image of the rectangular region S3 in FIG. 7, with the image of the rectangular region S3 in FIG. 8. By this image exchange, the image of the inclined part in FIG. 7 and the inclined part in FIG. 8 are combined, and the object extraction image P5 having the outline W1 in FIG. 4 is reconstructed.

Figure 2:
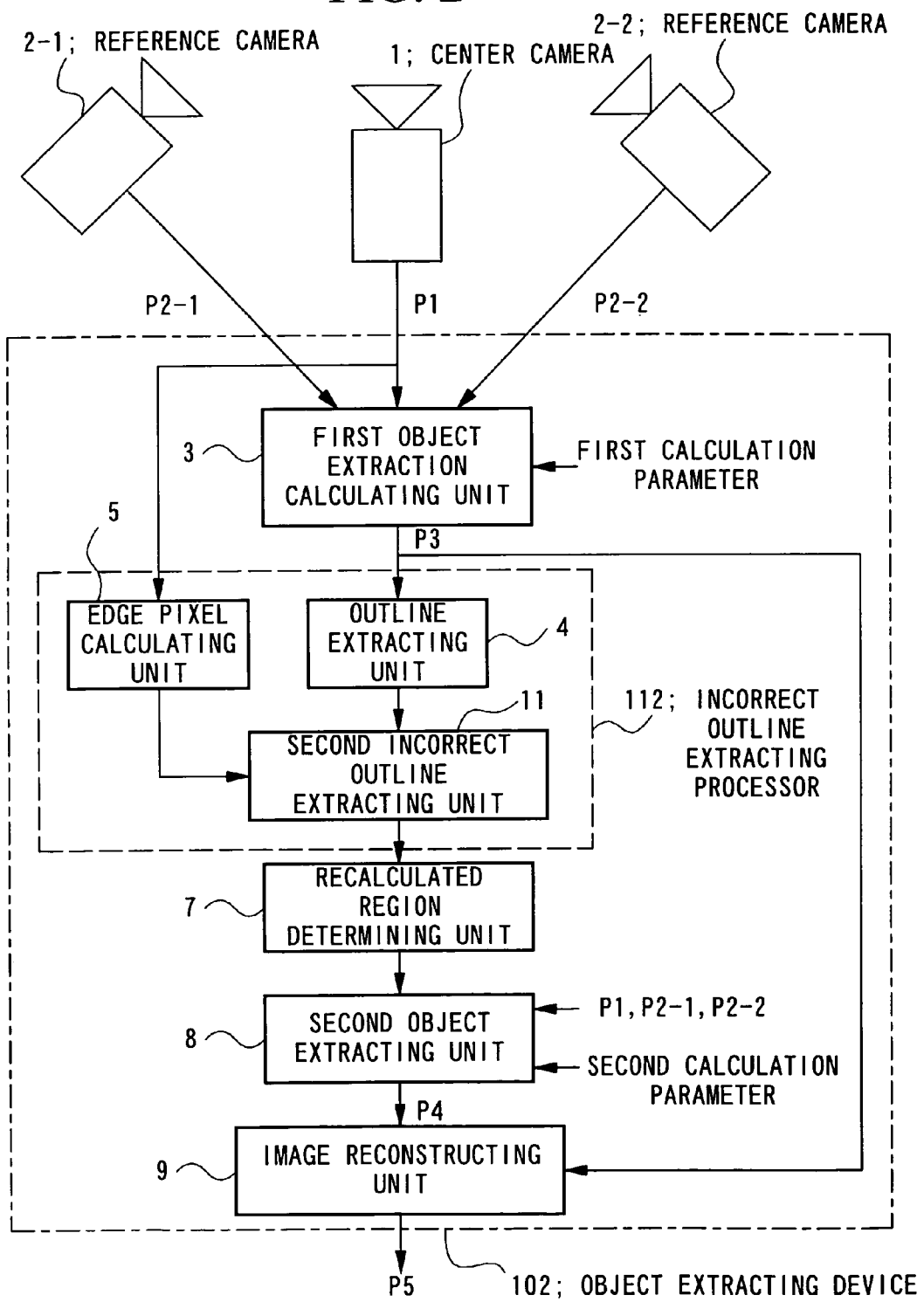
FIG. 2 is a block drawing showing the structure of the object extraction device 102 according to the second embodiment of the present invention.

Next, FIG. 2 is a block diagram showing the structure of the object extraction device 102 according to the second embodiment of the present invention. In this figure, only the second incorrect outline extraction unit 11 in the incorrect outline extraction processor 112 differs from the object extraction device 101 in FIG. 1. This second incorrect outline extraction unit 11 extracts as an incorrect outline the straight part that is the outline part within the outline extracted by the outline extraction unit 4 that intersects the pixels of the edge part found by the edge pixel calculating unit 5, and has a length exceeding a predetermined threshold value.

FIG. 9 to FIG. 14 are one example of drawings for explaining the operation of the above-described object extraction device 102, and referring to these figures, the operation of the object extraction unit 102 will be explained below.

Figure 9:
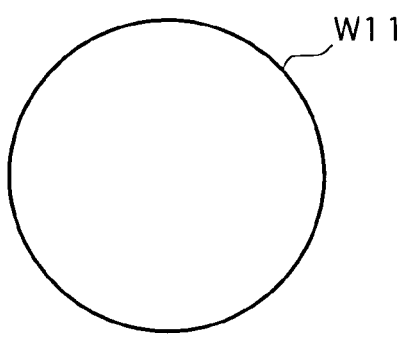
FIG. 9 is a first drawing for explaining the operation of the object extraction device 102 shown in FIG. 2.

First, FIG. 9 shows the outline W11 of an object photographed by the center camera 1, and the outline W11 of the complete circle and interior of the outline W11 comprise the object. In the beginning, the center image 1 and the reference images P2-1 and 2-2, which are the object photographed by the center camera 1 and the reference cameras 2-1 and 2-2, are input into the object extraction device 102, and the object extraction image P3 shown in FIG. 10 is found by the first object extraction calculating unit 3 using the first calculation parameter, where in FIG. 10, the solid lines between points B1–B2, B2–B3, and B3–B1 and the interior surrounded by the solid lines are the object extraction image P3.

Figure 10:
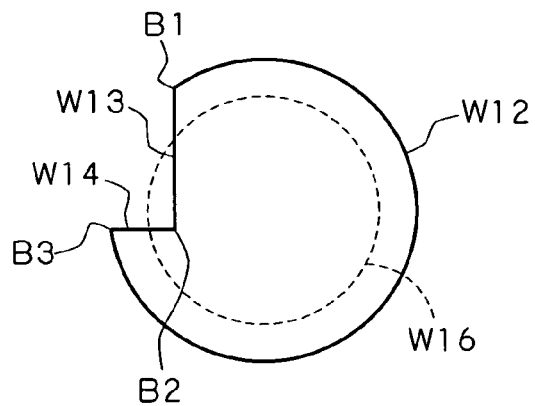
FIG. 10 is a second drawing for explaining the operation of the object extraction device 102 shown in FIG. 2.
Figure 11:
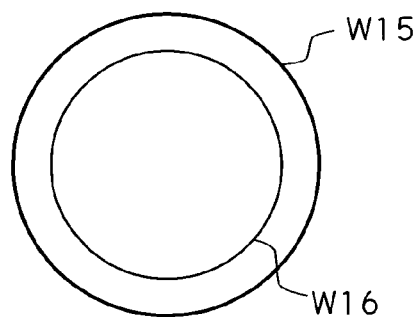
FIG. 11 is a third drawing for explaining the operation of the object extraction device 102 shown in FIG. 2.

Next, from the object extraction image in FIG. 10, the outline extraction unit 4 extracts as the outline of the object the outline W12 between points B1–B3, which are one part of the complete circle, the outline W13, which is the straight line segment between points B1–B2, and the outline W14, which is the straight line segment between points B2 and B3. However, outline W12 is a part of the outline W11, and outlines W13 and W14 are not included in outline W11. In addition, the edge pixel calculating unit 5 extracts the pixels in the edge waveforms W15 and W16 shown in FIG. 11 as the edge part of the object from the input center image P1, where the edge waveform 15 is equal to the outline W11.

Next, the second incorrect extraction unit 11 extracts as an incorrect outline both the outlines W13 and W14 that are straight line segments that have lengths that exceed a predetermined threshold value in the outlines W13 and W14 that intersect the pixels of the edge waveform W16 (shown by the broken line in FIG. 10) found by the edge pixel extraction unit 5 among the outlines W12 to W14 that were extracted by the outline extraction unit 4. Moreover, in the case that an incorrect outline is not extracted, the processing stops, and the object extraction image P3 is made the object extraction image P5 by the image reconstructing unit 9.

Figure 12:
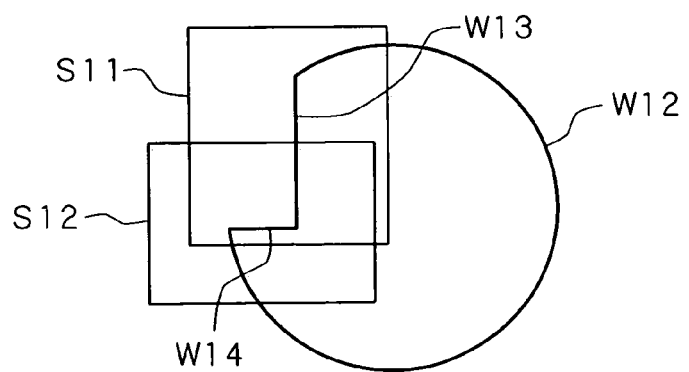
FIG. 12 is a fourth drawing for explaining the operation of the object extraction device 102 shown in FIG. 2.
Figure 13:
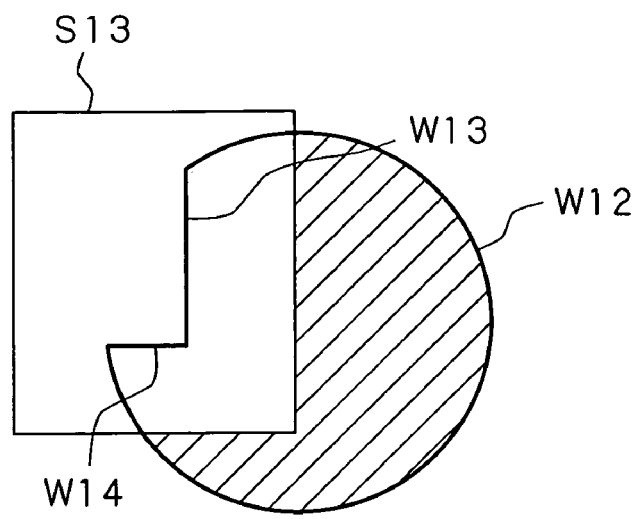
FIG. 13 is a fifth drawing for explaining the operation of the object extraction device 102 shown in FIG. 2.

Next, like the above-described first embodiment, the recalculated region determining unit 7 determines as the recalculated region the rectangular region S13, shown in FIG. 13, that has the smallest area, and is the rectangular region that encompasses the rectangular region S11 having the predetermined range shown in FIG. 12 that includes the outline W13 that was extracted as an incorrect outline by the first incorrect outline extraction unit 6 and the rectangular region S12 that has a predetermined range including outline W14.

Figure 14:
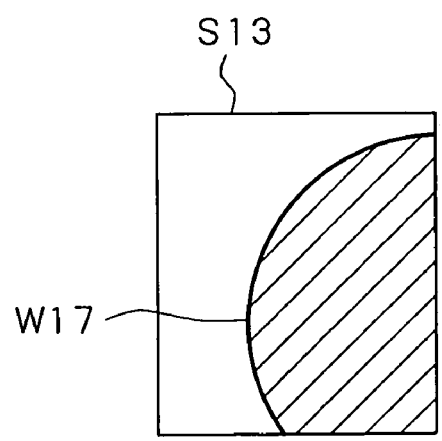
FIG. 14 is a sixth drawing for explaining the operation of the object extraction device 102 shown in FIG. 2.

Next, the second object extraction calculating unit 8 carries out the object extraction calculation for the rectangular region S13 using a predetermined second calculation parameter on the input center image P1 and the reference images P2-1 and 2-2, and finds as the re-extracted image P4 the outline W17, shown in FIG. 14, and the inclined part enclosed by this outline.

Next, like the above-described first embodiment, the image reconstructing part 9 combines the image of the inclined part in FIG. 13 and the inclined part in FIG. 14 by exchanging the image of the rectangular region S13 in FIG. 13 and the image of the rectangular region S13 in FIG. 14, and thereby reconstructs the object extraction image P5 having the outline W11 shown in FIG. 9.

Figure 3:
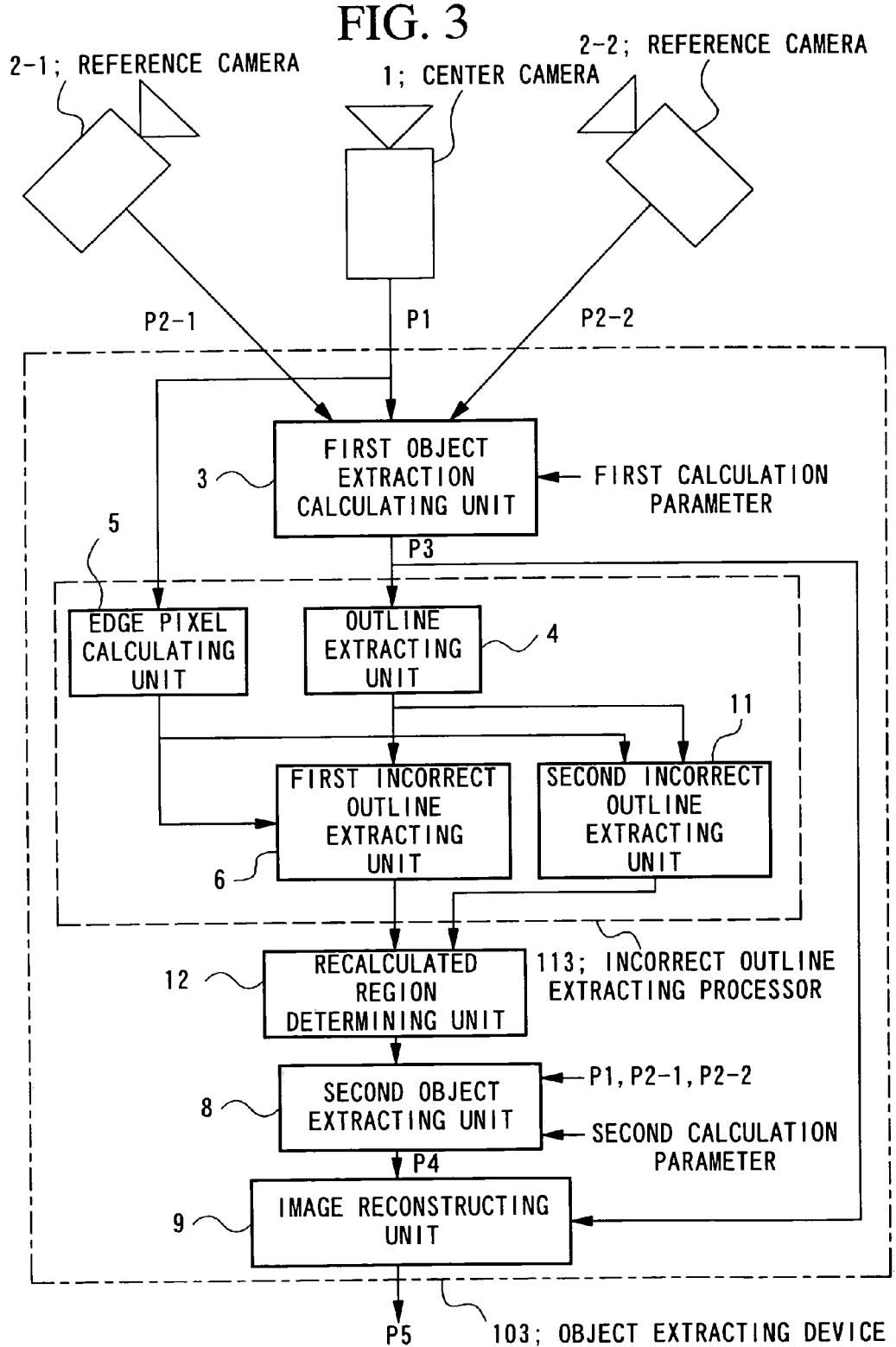
FIG. 3 is a block drawing showing the structure of the object extraction device 103 according to the third embodiment of the present invention.

Next, FIG. 3 is a block diagram showing the structure of the object extraction device 103 according to the third embodiment of the present invention. In this figure, the structure differs from the above-described embodiments in that the incorrect outline exacting processor 113 has a first incorrect extraction unit 6 of the first embodiment and the second incorrect outline extraction unit 11 of the second embodiment, and the recalculated region determining unit 12 determines as the recalculated region the rectangular region having a predetermined range that includes this incorrect outline for the incorrect outline extracted by the first and second incorrect outline extraction units 6 and 11. Therefore, the region that becomes the recalculated region extracted as the incorrect outline by the object extraction device 103 is either one or a plurality of the rectangular regions in the rectangular region having the smallest area that is the rectangular region having a predetermined range, which is the outline part that does not include the pixels in the edge part found by the edge pixel calculating unit 5, and includes a straight line segment that has a length exceeding a predetermined first threshold value, the rectangular region that has a predetermined region that is the outline part that intersects the pixels of the edge part and includes a straight line segment that has a length exceeding a predetermined second threshold value, and a rectangular region that encompasses all of the overlapping recalculated region. Moreover, the structure of the other blocks and their operation is identical to that of the above-described embodiments.

Moreover, in the above-described embodiments, if the first and second incorrect outline extraction units 6 and 11 extract as the incorrect outline the straight line segment along the scanning direction of the center image P1, then the amount of calculation expended in the incorrect outline extraction can be reduced.

Moreover, in the above-described embodiments, because the recalculated region determining units 7 and 12 re-determine as the recalculated region the rectangular region that includes all of the overlapping recalculated region and has the smallest area, the redundant parts being calculated several times can be avoided, and the amount of calculation of the second object extraction calculating unit 8 can be reduced.

Moreover, in the above-described embodiments, the recalculated region determining units 7 and 12 determine as the rectangular region the recalculated region, but the shape of the recalculated region is not limited to being a rectangle.

Moreover, a program for reading each of the parts shown in FIGS. 1, 2, and 3 can be stored on computer readable recording media, and the object extraction processing carried out by reading the program stored on these recording media into a computer system and executing the program. Moreover, here, "computer system" includes any OS and hardware such as peripheral devices. In addition, in the case that the WWW system is used, "computer system" includes any home page providing environment (or display environment). In addition, "computer readable recording media" denotes memory media such as transferable media, examples being floppy disks, opto-magnetic disks, ROMs, and CD-ROMs, and hard disks built-into computer systems.

Furthermore, "computer readable recording media" includes items (such as transmitting media and transmission waves) that dynamically maintain the program for a short time interval, such as a communication line used when transmitting the program via telecommunication lines such as networks and telephone lines, an example being the Internet, and in this case, items which maintain the program temporarily, such as the volatile memory in a computer system serving as a server or client. In addition, the above-described program can realize one part of the functions described above, and furthermore, the above-described functions can be realized by a combination of programs, that is, sub-files (or sub-programs), that are already stored in a computer system.

Moreover, in the above-described embodiments, the second object extraction calculating unit 8 can compare the second calculation parameter used in the object extraction calculation with the first calculation parameter used by the first object extraction calculating unit 3, and by making the calculation parameter carry out a more sophisticated object extraction calculation, can correct the incorrect outline generated by the first object extraction calculating unit 3 by carrying out a more sophisticated calculation on the part suspected of being an incorrect outline.

Furthermore, compared to the case of using a calculation parameter for carrying out a more sophisticated object extraction calculation in the conventional object extraction device, carrying out a more sophisticated calculation is not limited to the part suspected of being an incorrect outline, and thus the overall amount of calculation of the object extraction can be decreased. As a result, the object extraction device according to the above-described embodiments of the present invention can be carried out by a small-scale computer such as a personal computer rather than a large-scale computer, as is done conventionally.

As explained above, the present invention finds the object extraction image by carrying out object extraction calculation using a predetermined first calculation parameter on a plurality of photographed images having parallax with respect to the same object, extracts an outline from this object extraction image, and extracts as an incorrect outline a straight line segment that has a length exceeding a predetermined threshold value within this extracted outline. In addition, by determining as a recalculated region the partial region that includes this extracted incorrect outline and carrying out object extraction calculation of the recalculated region using a predetermined second calculation parameter that differs form the first calculation parameter, finding the re-extracted image, which is the object extraction image of the recalculated region, and reconstructing the object extraction image based on the object extraction image found using this first calculation parameter and the re-extracted image, in comparison to the conventional art, an object extraction image can be obtained that matches the object.

What is claimed is:

1. An object extraction device, comprising:
    a first object extraction calculating device that finds an object extraction image by carrying out object extraction calculations for extraction of an object by using a predetermined first calculation parameter on a plurality of photographed images having a parallax with respect to the object;
    an incorrect outline extraction processing device that extracts an outline from the object extraction image found by said first object extraction calculating device and extracts an incorrect outline segment from the extracted outline;
    a recalculated region determining device that determines as a recalculated region a partial region that includes the incorrect outline segment extracted by said incorrect outline extraction processing device within an image region of one of the photographed images; and
    a second object extraction calculating device that finds a re-extracted image that comprises an object extraction image of the recalculated region by carrying out an object extraction calculation in order to eliminate the incorrect outline segment in the recalculated region by using a second calculation parameter that is different from the first calculation parameter on said plurality of photographed images.

2. An object extraction device according to claim 1, wherein said incorrect outline extraction processing device comprises:
    an outline extraction device that extracts the outline from the object extraction image found by said first object extraction calculating device;
    an edge pixel calculating device that finds an edge part of the object from a predetermined photographed image from among the plurality of photographed images; and
    an incorrect outline extraction device that extracts as the incorrect outline segment a straight line segment that is within the outline extracted by said outline extraction device, that comprises an outline part that does not include the edge part found by said edge pixel calculating device, and that has a length exceeding a predetermined threshold value.

3. An outline extraction device according to claim 1, wherein said incorrect outline processing device comprises:
    an outline extraction device that extracts the outline from the object extraction image found by said first object extraction calculating device;
    an edge pixel calculating device that finds an edge part of the object from a specified photographed image from among the plurality of photographed images; and
    an incorrect outline extraction device that extracts as an incorrect outline segment a straight line segment that comprises an outline part within the outline extracted by said outline extraction device, that does not include the edge part found by said edge pixel calculating devices, and that has a length exceeding a predetermined threshold value.

4. An object extraction device according to claim 1, wherein said incorrect outline processing device comprises:
    an outline extraction device that extracts the outline from the object extraction image found by said first object extraction calculating device;
    an edge pixel calculating device that finds an edge part of the object from a specified photographed image from among the plurality of photographed images; and
    an incorrect outline extraction device that extracts as the incorrect outline segment (a) a straight line segment that comprises an outline part within the outline extracted by said outline extraction device, that does not include the edge part found by said edge pixel calculating device, and that has a length exceeding a predetermined first threshold value, and (b) a straight line segment that comprises an outline part that intersects the edge part found by said edge pixel calculating device and that has a length exceeding a predetermined second threshold value.

5. An object extraction device according to claim 2, wherein the straight line segment extends along the scanning direction of a photographed image.

6. An object extraction device according to claim 1, wherein the recalculated region comprises a rectangular region having a predetermined range that includes the incorrect outline segment.

7. An object extraction device according to claim 1, wherein said recalculated region determining device re-determines as the recalculated region a region that encompasses all of the overlapping recalculated regions instead of a plurality of the overlapping recalculated regions.

8. An object extraction device according to claim 7, wherein the recalculated region that has been re-determined comprises the rectangular region having the smallest area.

9. An object extraction device according to claim 1, further comprising an image reconstructing device that reconstructs an image of the object based on the object extraction image found by said first object extraction calculating device and the re-extracted image found by said second object extraction calculating device.

10. An object extraction device according to claim 9, wherein said image reconstructing device reconstructs an image of the object by exchanging an image in a region corresponding to the recalculated region within the image region of the object extraction image found by said first object extraction calculating device and the re-extracted image found by said second object extraction calculating device.

11. An object extraction device according to claim 10, wherein the second calculation parameter comprises a calculation parameter that is used to carry out an object extraction calculation that is more sophisticated than the first calculation parameter.

12. An object extraction device according to claim 10, wherein the object extraction device comprises a small-scale computer.

13. An object extraction device according to claim 1, wherein said plurality of photographed images are photographed by a plurality of cameras that photograph the object from different directions.

14. An object extraction device, comprising:
a first object extraction calculating device that repeats an object extraction calculation for eliminating an incorrect outline segment from a predetermined partial region on a plurality of photographed images having parallax with respect to an object using a second calculation parameter that is different from a first calculation parameter, and finds a re-extracted image which comprises an object extraction image of the partial regions;
a recalculated region determining device that determines the partial region that includes the incorrect outline segment as a recalculated region; and
a second object extraction calculating device that finds a re-extracted image that comprises an object extraction image of the recalculated region by carrying out an object extraction calculation in order to eliminate the incorrect outline segment in the recalculated region by using the second calculation parameter on said plurality of photographed images.

15. An object calculating device according to claim 14, wherein the partial region comprises a region that includes an outline part determined to be an incorrect outline segment within the image region of the object extraction image found by carrying out the object extraction calculation for extraction of the object using the first calculation parameter.

16. An object extraction device according to claim 14, further comprising an image reconstructing device that reconstructs an image of the object by exchanging the image of the partial region within the object extraction image found by the object extraction calculation using the first calculation parameter and the re-extracted image.

17. An object extraction method comprising:
finding an object extraction image by carrying out an object extraction calculation for extraction of an object, using a predetermined first calculation parameter on a plurality of photographed images that have parallax with respect to the object;
extracting an outline from the object extraction image;
extracting an incorrect outline segment from the extracted outline;
determining as a recalculated region a partial region that includes the incorrect outline segment within an image region of one of the photographed images;
finding a re-extracted image, which comprises an object extraction image of the recalculated region, by carrying out an object extraction calculation for eliminating the incorrect outline segment in the recalculated region using a predetermined second calculation parameter that is different from the first calculation parameter on the plurality of photographed images; and
reconstructing an image of the object based on the object extraction image and the re-extracted image.

18. An object extraction method according to claim 17, wherein the incorrect outline extracting comprises finding an edge part of the object from the one of the photographed images, and extracting as the incorrect outline segment either or both of (a) a straight line segment that is within the extracted outline, that comprises an outline part not included in the found edge part, and that has a length exceeding a predetermined first threshold value, and (b) a straight line segment that comprises an outline part that intersects the found edge part and that has a length exceeding a predetermined second threshold value.

19. A recording medium that stores an object extraction program that executes an object extraction method on a computer, wherein said method comprises:
finding an object extraction image by carrying out an object extraction calculation for extraction of an object using a predetermined first calculation parameter on a plurality of photographed images having parallax with respect to the object;
extracting an outline from the object extraction image; and
extracting an incorrect outline segment from the extracted outline;
determining as a recalculated region a partial region that includes the incorrect outline segment within an image region of one of the photographed images;
finding a re-extracted image, which comprises an object extraction image of the recalculated region, by carrying out an object extraction calculation for eliminating the incorrect outline segment in the recalculated region using a predetermined second calculation parameter that is different from the first calculation parameter on the plurality of photographed images; and
reconstructing an image of the object based on the object extraction image and the re-extracted image.

20. A recording medium that stores an object extraction program according to claim 19, wherein extracting the incorrect outline segment comprises:
finding an edge part of the object from a predetermined photographed image from among plurality of photographed images; and
extracting as incorrect outline segments either or both of (a) a straight line segment that comprises an outline part within the extracted outline, that is not included in the found edge part, and that has a length exceeding a predetermined first threshold value, and (b) a straight line segment that comprises an outline part that intersects the found edge part and that has a length exceeding a predetermined second threshold value.

21. A computer medium that stores an object extraction program that executes on a computer a process, the process comprising:
finding a re-extracted image, which comprises an object extraction image of a predetermined partial region, by repeating an object extraction calculation for eliminating incorrect outline segments within the partial region on a plurality of photographed images having parallax with respect to an object, using a second calculation parameter that is different from a first calculation parameter;
determining the partial region that includes the incorrect outline segments as a recalculated region; and
finding a re-extracted image that comprises an object extraction image of the recalculated region by carrying out an object extraction calculation in order to eliminate the incorrect outline segment in the recalculated region by using the second calculation parameter on said plurality of photographed images.

22. A recording medium that stores an object extraction program according to claim 21, wherein said process further determines in a partial region a region that includes a determined outline part as an incorrect outline segment within an image region of the object extraction image found by carrying out the object extraction calculation for extraction of the object using the first calculation parameter.

23. A recording medium that stores an object extraction program according to claim 21, wherein said process further reconstructs an image of the object by exchanging the image of the partial region within the object extraction image found by the object extraction calculation using the initial calculation parameter and the re-extracted image.

* * * * *